(No Model.)

D. W. SCOBIE.
Harrow.

No. 238,533. Patented March 8, 1881.

Witnesses:
E. J. Asmus
J. C. Peck

Inventor:
David W. Scobie
By Jas. B. Erwin
Attorney

UNITED STATES PATENT OFFICE.

DAVID W. SCOBIE, OF CAMBRIDGE, WISCONSIN.

HARROW.

SPECIFICATION forming part of Letters Patent No. 238,533, dated March 8, 1881.

Application filed October 25, 1880. (No model.)

*To all whom it may concern:*

Be it known that I, DAVID W. SCOBIE, a citizen of the United States, residing at Cambridge, in the county of Dane and State of Wisconsin, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in that class of adjustable-toothed harrows in which the inclination of the teeth to the ground is changed by turning the bars in their bearings, which class is further shown by Patents Nos. 174,089, 166,763, and 180,498.

My invention consists in the peculiar form of coupling-iron or device for adjusting the bars in giving the required angle to the teeth, and also in the manner of connecting the two sections composing the harrow together.

Heretofore it has been common to attach the coupling-iron and rounded bars to each other with a U-shaped band or clip, the central portion of which surrounds the bar, and its arms or upper ends extend through the coupling-iron, and are each provided with nuts by which the band is tightened around the bar, whereby the bar is retained where adjusted. As a substitute for this device I use an ordinary bolt, which passes through and is rigidly secured in a hole at the center of the bar, its upper end projecting therefrom through a slot in a circular cast-metal coupling-iron, whereby the adjusting of the bar and teeth is accomplished by changing the relative position of the bolt in the slot of the coupling-iron.

It has also been common, in securing the two sections of the harrow together, to couple the ends of all the bars in one section to the ends of all the bars in the other section, while in my harrow the front bars only of the respective sections are coupled together, and the respective sections are left free to move upward and downward in conforming to an uneven surface independently of each other.

My invention is further explained by reference to the accompanying drawings, in which—

Figure 1:
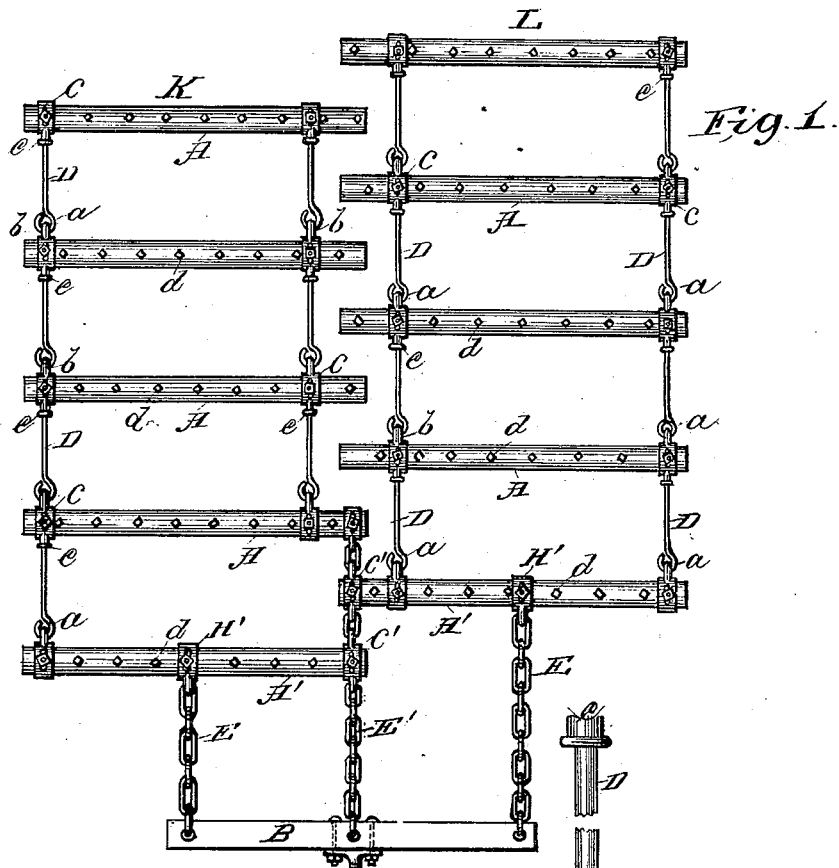
Figure 2:
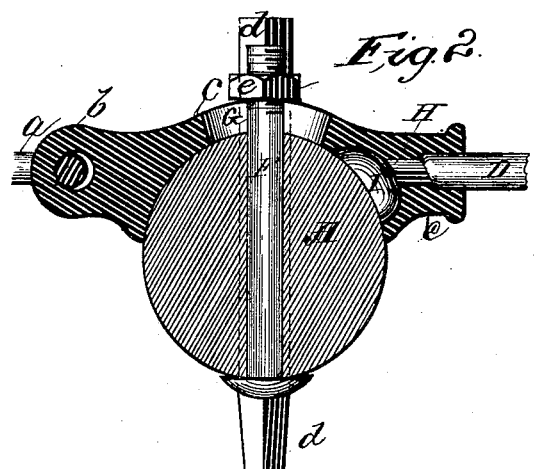
Figure 3:
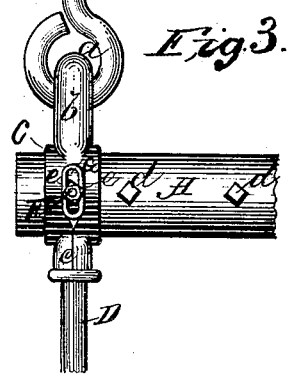

Figure 1 represents a top view. Fig. 2 is a detailed view, in section, of the bar and coupling-irons. Fig. 3 is a top view, in detail, of one of the bars and coupling-irons.

Like parts are represented by the same reference-letters.

A are the bars of the harrow, through which the teeth d are driven and secured in the ordinary manner.

C are coupling-irons by which the bars A are adjusted at the required angles and connected together. The bars C are provided with slots G for the reception of bolts F. The lower surfaces of the coupling-irons C are concave in shape, conforming to the rounded surfaces of the bars A, which are cylindrical in shape, as shown in Fig. 2. When desirous to change the angle of the teeth to the bar, the nuts e are loosened. The bar A is then turned until the desired angle is given to the teeth, when the nut e is tightened, and the bar is thereby rigidly held at the required position. The coupling-irons C are provided with connecting-rods D upon one side and eyes or loops b upon the other. The rear ends of rods D are rigidly secured to the coupling-irons C, as shown in Fig. 2, the rod D being driven through the orifice H when heated, when the inner end is upset or enlarged, forming head I, which securely retains the rod in the coupling-iron. Loops are formed upon the front ends of rods D, by which they are attached to the coupling-irons. The eye b is dispensed with in the rear coupling-iron, while rods D and the socket or orifice H are dispensed with in the front irons.

K and L represent the two sections composing the harrow. They are connected together by chains E E and E' and draft-evener B. Chains E E are respectively connected with the centers of the front bars, A' A', by coupling-irons H' H'. The central chain, E', is attached to the first two bars in section K and the front bar only of section L, whereby the ends of the respective bars in one section are retained midway between the ends of the respective bars in the other section, and the sections and the bars composing them are free to move upward and downward independently of each other, and thus conform to rough and uneven surfaces. The bars are thus arranged that the sections may also lap each other and more completely cover the ground, while in those harrows in which the ends of the bars bear against each other an imperfectly-harrowed strip is left between them.

Having thus described my invention, what I claim as new, and desire to secure by Letters Patent, is—

1. The circular cast-metal coupling-iron C, as adapted to conform to the rounded surface of the bar A, provided with slot G and socket or orifice H, substantially as set forth.

2. The improvement in adjustable-toothed harrows herein described, consisting in the combination of the circular coupling-iron C, provided with slot G and socket H, rod D, as rigidly secured thereon by head I, cylindrical bar A, provided with adjusting-bolt operating in slot G, all substantially as set forth.

In testimony whereof I affix my signature in presence of two witnesses.

DAVID W. SCOBIE.

Witnesses:
JAS. B. ERWIN,
E. G. ASMUS.